United States Patent

Weaver

[15] 3,690,200
[45] Sept. 12, 1972

[54] MACHINE CONTROL UTILIZING A PLURALITY OF CONTROL TEMPLATES AND TRACER MECHANISMS

[72] Inventor: Paul J. Weaver, San Marino, Calif.
[73] Assignee: Automatic Control Systems, Inc., 2, El Monte, Calif.
[22] Filed: Dec. 24, 1970
[21] Appl. No.: 101,338

Related U.S. Application Data

[63] Continuation-in-part of Ser. No. 872,492, Oct. 30, 1969.

[52] U.S. Cl..................................82/14 A, 90/13 B
[51] Int. Cl. .............................................B23b 3/28
[58] Field of Search....82/14 R, 14 A; 90/13 R, 13 B, 90/13.9

[56] References Cited

UNITED STATES PATENTS

| 3,272,039 | 9/1966 | Weaver | 82/14 |
| 3,262,647 | 7/1966 | Harrison | 82/14 X |
| 3,142,213 | 7/1964 | Weaver | 82/14 |

*Primary Examiner*—Gil Weidenfeld
*Attorney*—Angus & Mon

[57] ABSTRACT

A control system for controlling the movement of an element such as a cutting tool relative to a workpiece, maintaining the tool under continuous path control. The plane of the path relates to two non-parallel coordinate axes. The system includes a pair of working slides, one for each of said axes, and a pair of template support means for holding a template so that a reference surface bearing positioning information moves past a respective tracer mechanism on a path normal to the control motion of the tracer mechanism. Motor means under the control of respective tracer valves move the working slides so as to cause the cutting tool to form a desired contour in the workpiece. The templates are driven synchronously, and their reference surfaces are of indefinite length whereby a plurality of cutting passes can be made with one set of templates. If desired, another synchronously driven template is provided to exert concurrent control over other machine functions such as spindle speeds, pumping actions, and feed rate. The invention comprehends a means for designing the templates, and a machine controlled by the resulting templates.

23 Claims, 11 Drawing Figures

INVENTOR.
PAUL J. WEAVER

INVENTOR.
PAUL J. WEAVER
BY Angus & Mon
ATTORNEYS.

INVENTOR.
PAUL J. WEAVER
BY
Angus & Mon
ATTORNEYS.

INVENTOR.
PAUL J. WEAVER
BY
ATTORNEYS.

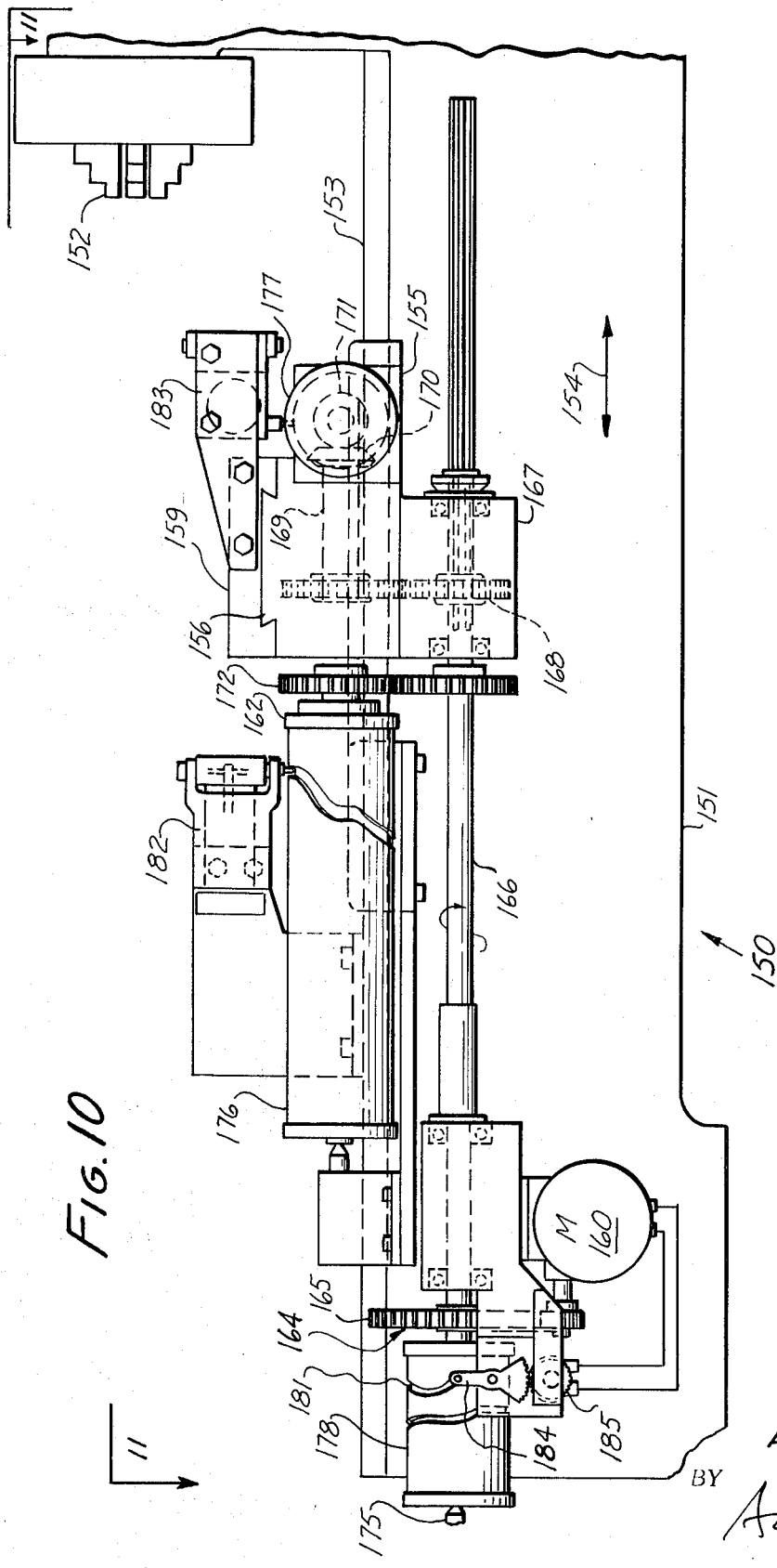

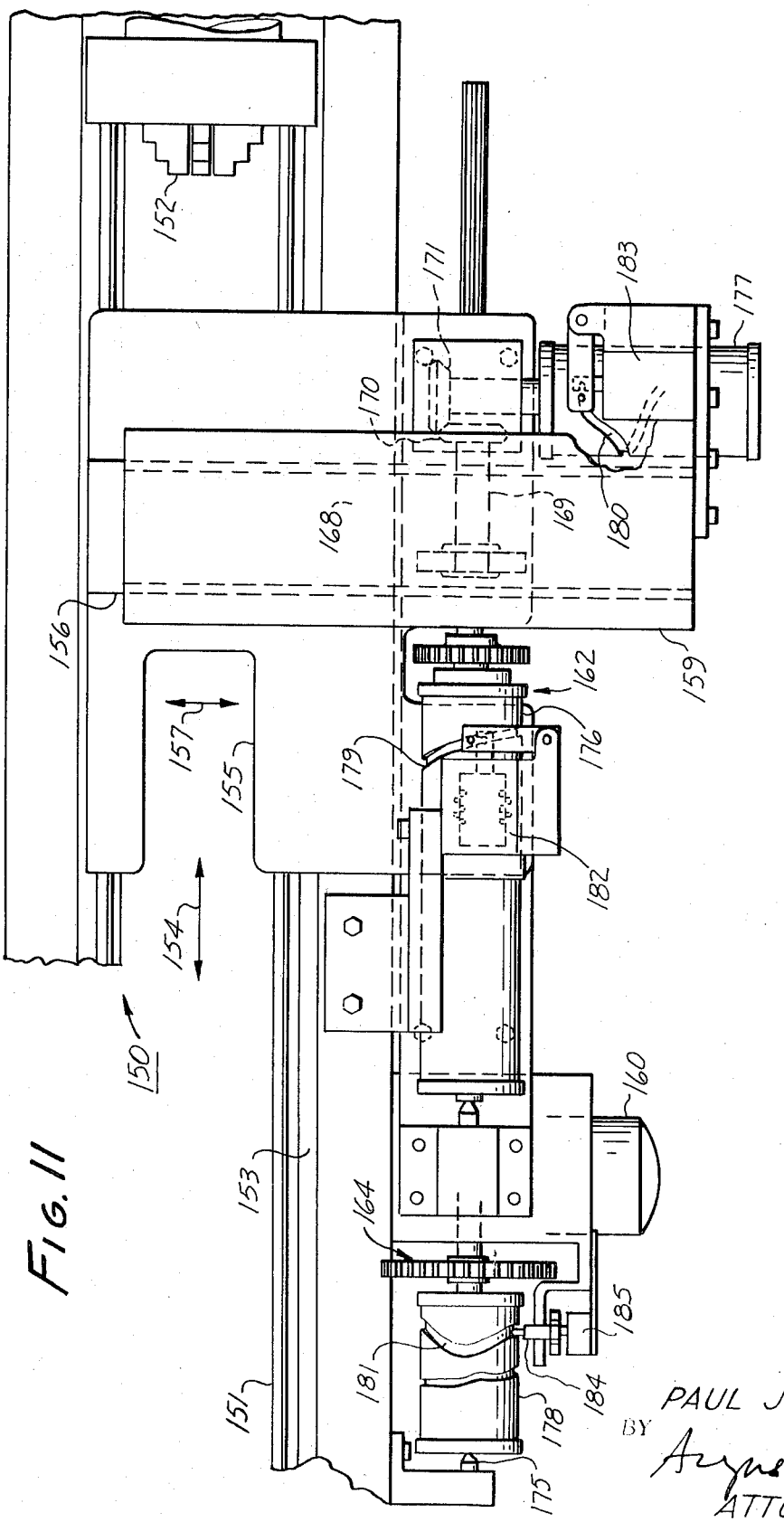

MACHINE CONTROL UTILIZING A PLURALITY OF CONTROL TEMPLATES AND TRACER MECHANISMS

CROSS REFERENCE TO OTHER APPLICATIONS

This patent application is a continuation-in-part of applicant's copending U.S. Pat. application Ser. No. 872,492 filed Oct. 30, 1969, entitled "Machine Control Utilizing a Plurality of Control Templates and Tracer Mechanisms," now abandoned.

This invention relates to machine controls utilizing tracer mechanisms. Cutting tools will be used as the specific example herein, but it will be understood that other devices requiring positioning of a working element may be used instead.

Tracer controlled machine tool systems are well known. The function of a conventional tracer mechanism is to respond to the contour of a template or pattern so as to shift the machine tool element that carries a cutting tool and traverse a specific path in space so as to duplicate the shape of the template in the part.

Existing tracer technology has serious limitations, one of the most troublesome being that the contour of the template must be identical to the contour of the part, and can therefore define only one single point in space at any axial location along the path. Therefore, it is an inherent limitation that a conventional tracer can provide only one pass per template, and a complete part cannot be produced by a single tracer operation except for unusually simple parts. Accordingly, the tracer-controlled systems have come to be thought of as "finishing" systems, with the rough and intermediate cutting operations performed by other devices. A part is frequently loaded and unloaded, or tools and templates changed, several times in the process of manufacture. It is an object of this invention to free tracer-controlled machine tools from such limitations, to provide a means whereby templates may be manufactured more readily to closer tolerances than heretofore possible, and without any necessary resemblance to the part to be produced, to permit a plurality of passes to be made from a single template without unloading and reloading the machine, and to maintain a continuous path control over the device within its plane of operation.

Another object of this invention is to provide means for calculating and designing the reference surfaces of the templates, and to provide a machine programmed with said templates.

A control system according to this invention is utilized in combination with a machine such as a machine tool which has a fixed base that carries a first working slideway and a first working slide, and upon the first a first working slide a second working slideway and a second working slide, whereby the second working slide may be moved throughout an entire operational plane. A working element such as a cutting tool is carried by the second working slide so as to be positionable to cut a contour in a workpiece which, in the case of a lathe, is held by a chuck.

A first and a second template support means is provided whereby the reference surface of a respective template can be moved past a respective tracer mechanism on a path normal to the control motion of the tracer mechanism. Examples of such template support means are control sideways and slides, and control spindles. The tracer mechanisms are in turn linked to motor means which respectively drive the first and second working slides. The template support means carrying the templates are driven synchronously so that relative to the working slide a distinct position along the reference surfaces of the two templates defines a position in space unique to the spacing of each of the template contours from a respective datum line. It therefore follows that by varying the distance from the datum lines the cutting tool may be positioned at any location within the operating limits of the device, and enables a plurality of passes to be made with a single set of template edges.

According to a preferred but optional feature of the invention, the first and second tracer mechanisms are respectively attached to the first and second working slides, and the first and second template support means are mounted to the base or first working slideway and to the first working slide, respectively.

Accordingly to still another preferred but optional feature of the invention, another template is provided which is driven synchronously relative to the others, and a power control mechanism is responsive thereto to control the power supply to the drive means for driving the templates.

According to still another preferred but optional feature of the invention, a cumulative difference technique is disclosed for generating the shape of the reference surfaces of the templates, together with a suitably programmed machine tool utilizing the resulting templates.

The above and other features of this invention will be fully understood from the following detailed description and the accompanying drawings in which.

Figure 1:
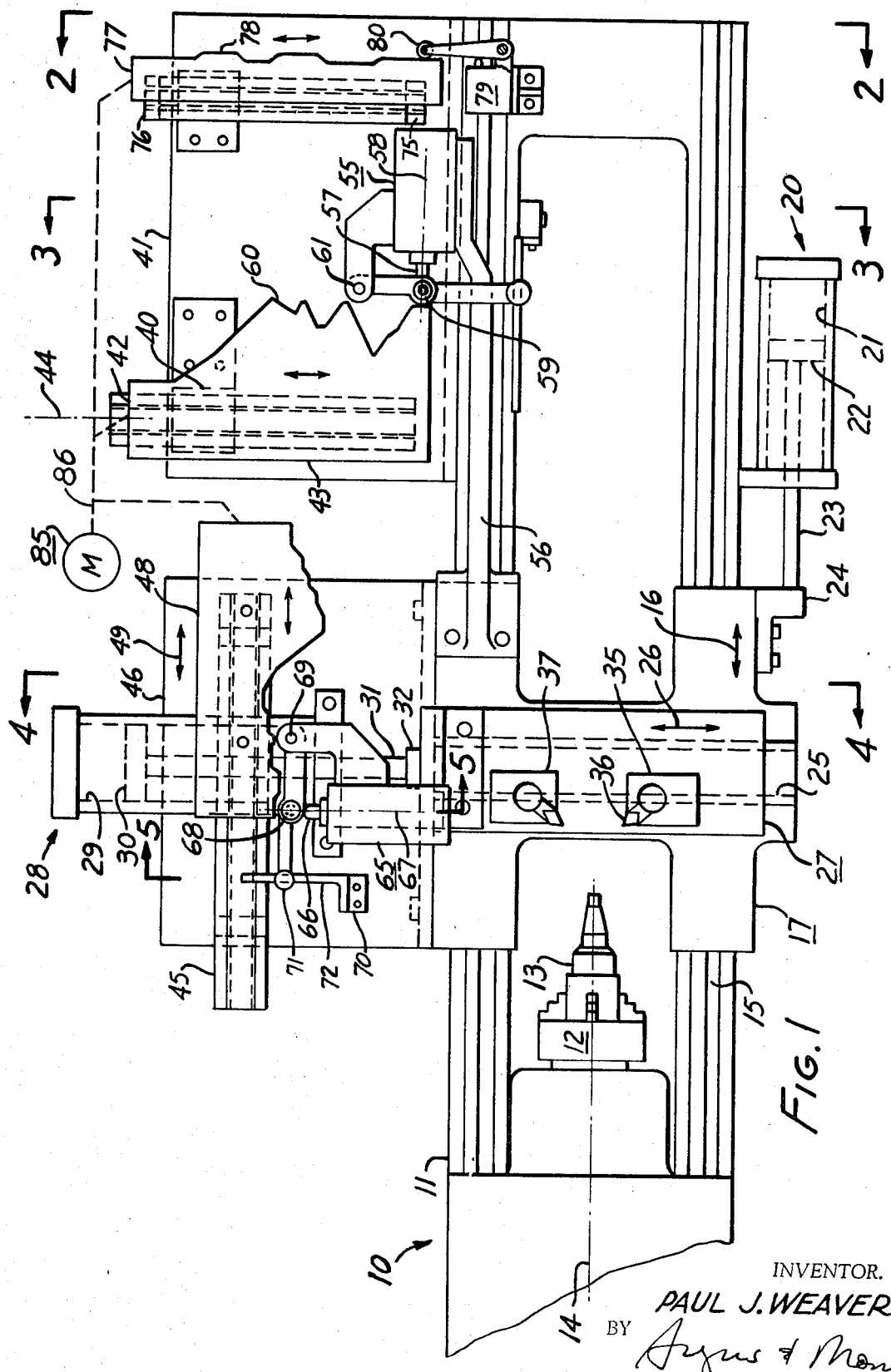
FIG. 1 is a plan view of an embodiment of the invention.
Figure 3:
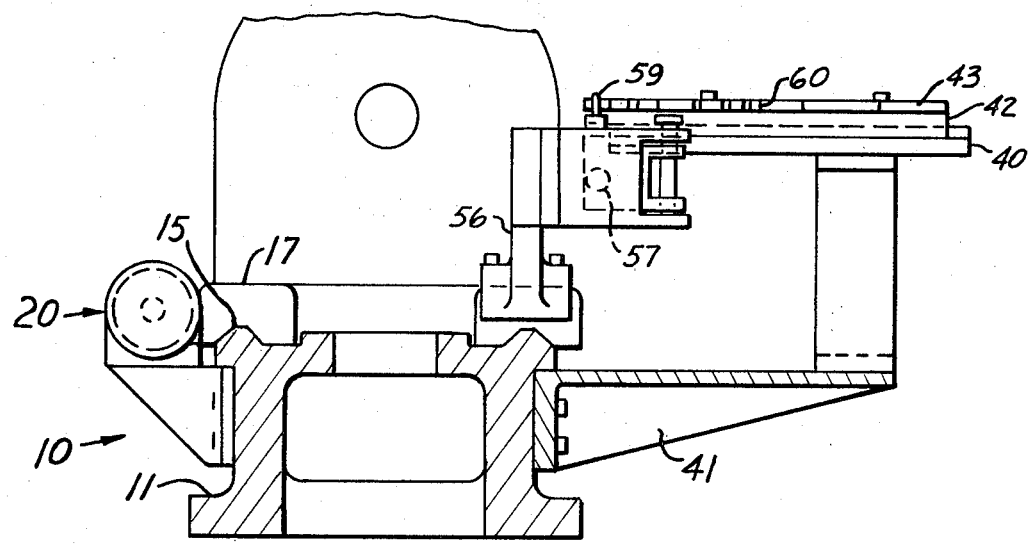
Figure 4:
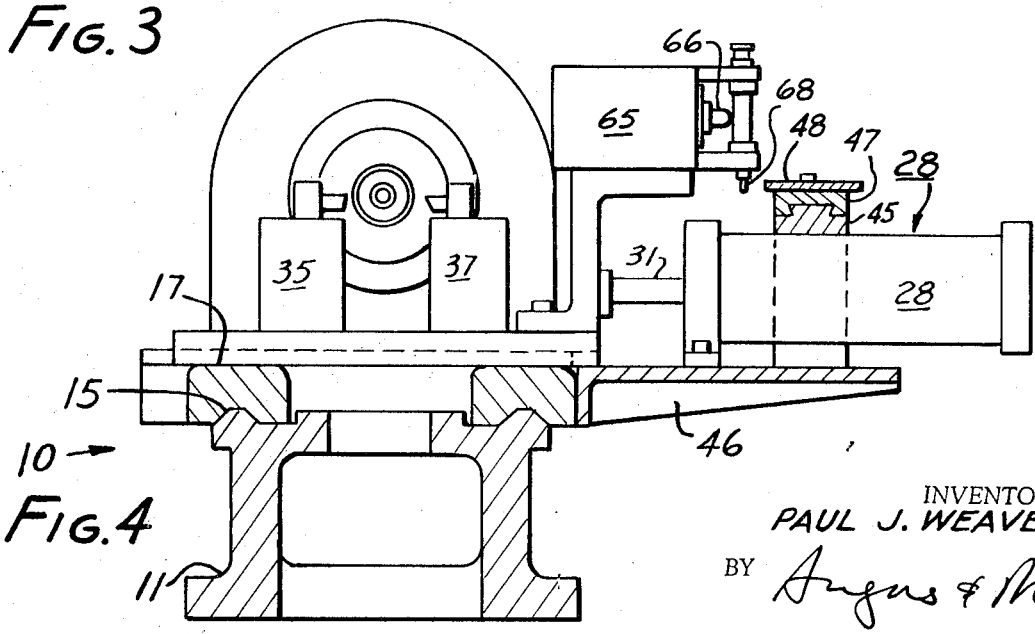
Figure 5:
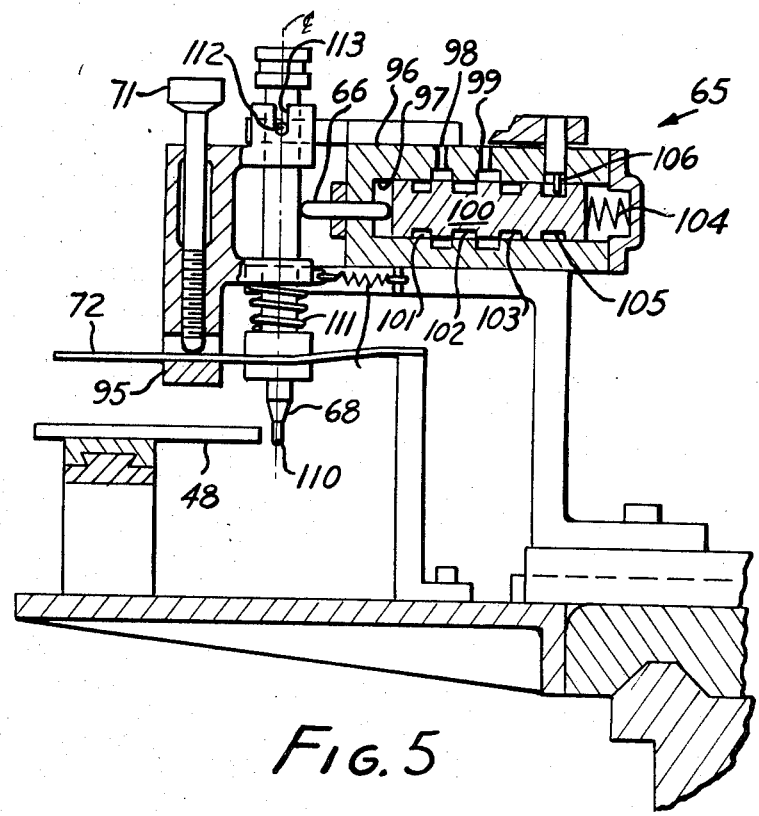
Figure 6:
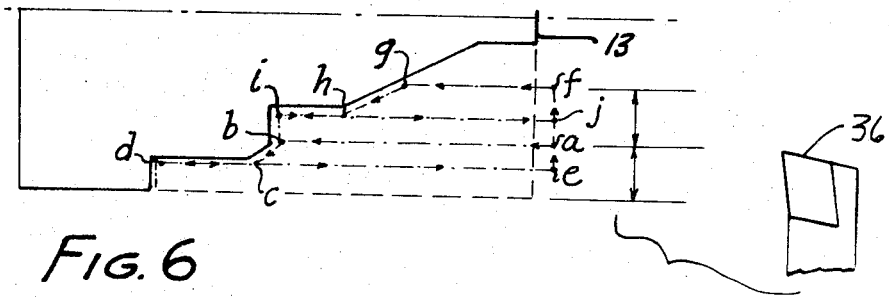
Figure 7:
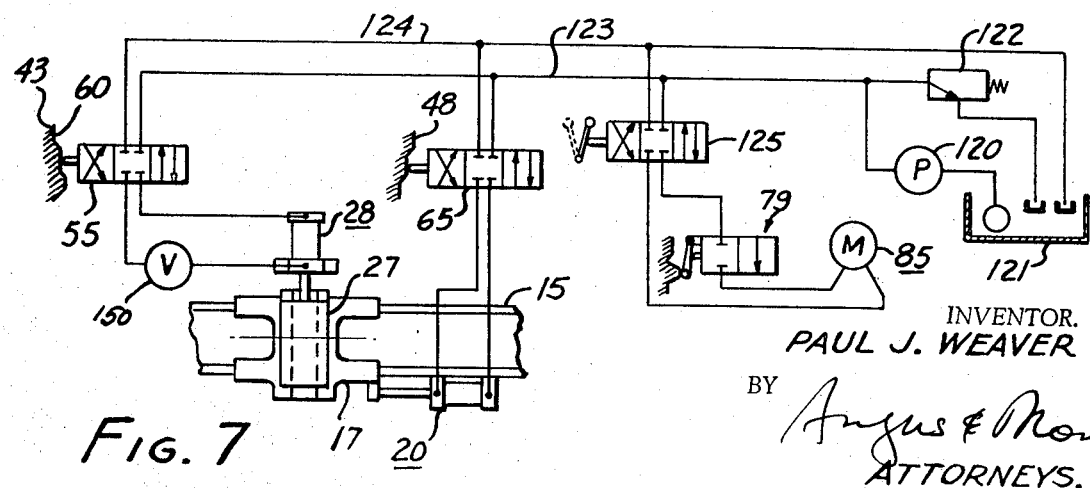
Figure 8:
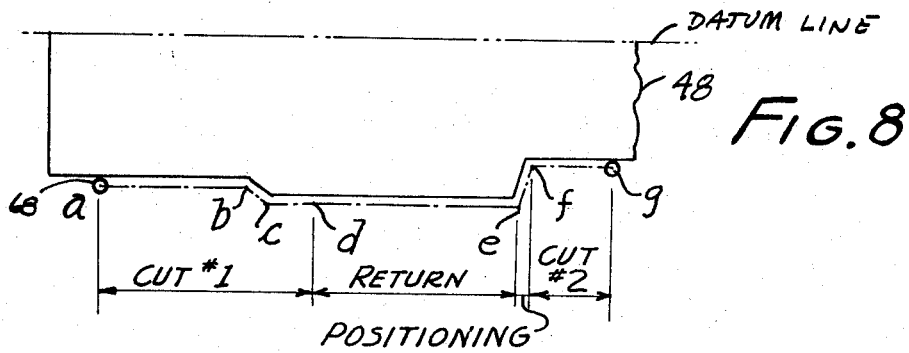
Figure 9:
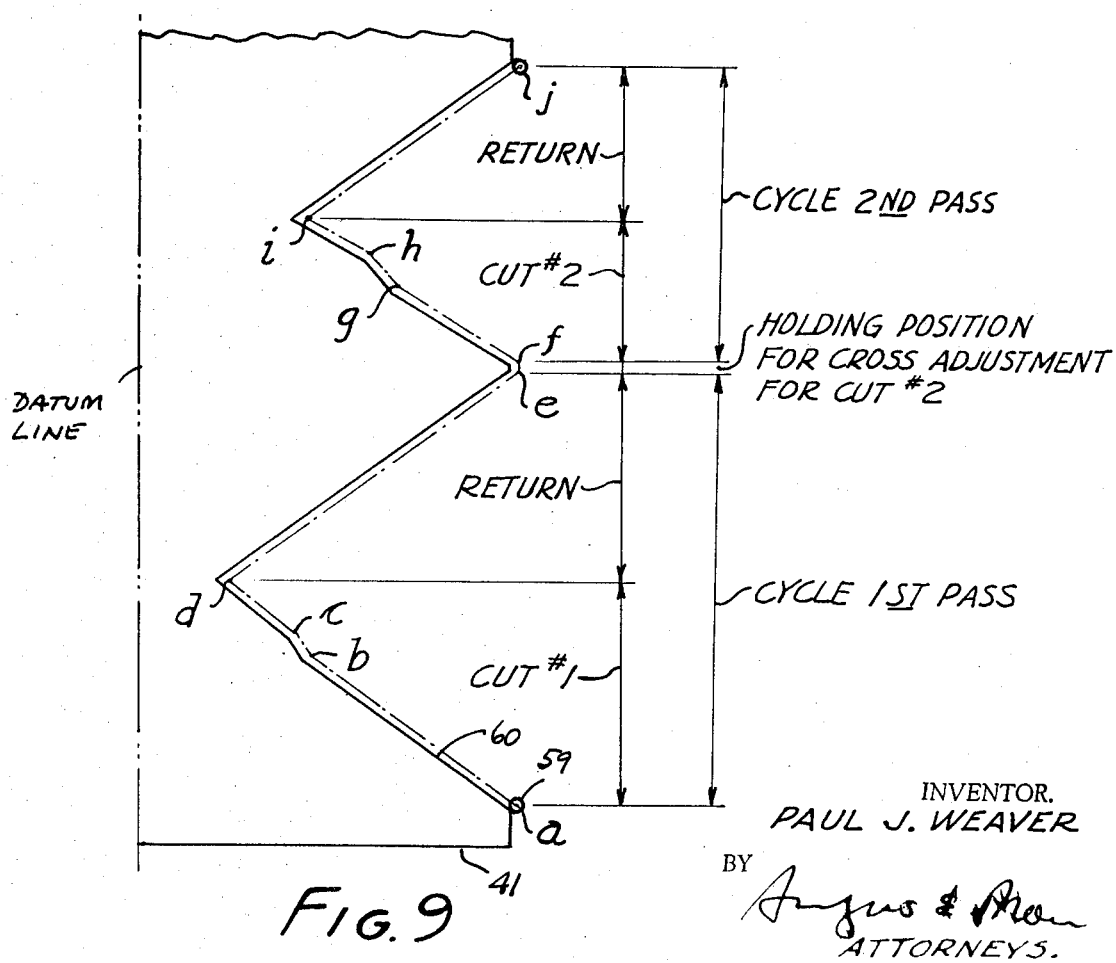

FIGS. 3 and 4 are cross sections taken at line 3—3 and 4—4, respectively, of FIG. 1;

FIG. 5 is an enlarged fragment of FIG. 1, principally in cross section taken at line 5—5 of FIG. 1;

FIG. 6 is a drawing showing two successive cutting passes under the continuous path control of this invention;

FIG. 7 shows a fluid control circuit useful with this invention;

FIGS. 8 and 9 are plan views of one embodiment of templates useful with this invention;

FIG. 10 is a side elevation view of the presently preferred embodiment of this invention; and FIG. 11 is a plan view of FIG. 10, taken at line 11—11 therein.

In FIG. 1 there is shown a lathe 10 having a base 11 which supports a power driven chuck 12 which holds a workpiece 13 and turns it around an axis of rotation 14. The purpose of the control system is to move a cutting tool so as to form a contour on the workpiece. This is only one example of the use of this system. Any system requiring positioning may use the system, such as in materials handling or the like, and, of course, other types of machine tools such as mills could similarly be controlled.

A first working slideway 15 is formed on the base and extends along first coordinate axis 16 (sometimes called the "Z" axis). Atop the first working slideway is a first working slide 17 mounted thereto in conventional manner so as to be reciprocally movable along the first working slideway. A first bi-directional motor means 20 is interposed between slideway 15 and slide 17 so as to drive the slide. It may conveniently comprise a cylinder 21 with a piston 22 and rod 23, the rod being connected by brackets 24 to the first working slide.

A second working slideway 25 is formed atop the first working slide. It extends along a second coordinate axis 26 (which is sometimes called the "X" axis). It is non-parallel to axis 16. A second working slide 27 is mounted to slideway 25 for reciprocally moving thereon. A second bi-directional motor means 28 is interposed between the second working slideway and the second working slide for reciprocally moving the slide along its respective slideway. Again, motor 28 may comprise a cylinder 29 mounted to the first working slide see FIG. 4, a piston 30 and a rod 31, which rod is connected by bracket 32 to the second working slide.

A tool mount 35 is mounted to the top of the second working slide so as to support a cutting tool 36. When desired, a second tool mount 37 may be provided for cutting the backside of the work when the system is programmed for this purpose. The cutting tool is movable throughout its plane of operation, the XZ plane, by the working slide system.

A first control slideway 40 is mounted to an extension 41 of base 11. It extends non-parallel to the first coordinate axis and is preferably normal thereto. A first control slide 42 is reciprocally mounted to first working slideway 41 (or the base, which for practical purposes is the same) and is adapted to support a first template 43 for reciprocation along template motion axis 44.

A second control slideway 45 is mounted to an extension 46 of the first occurrence, to working slide (see FIG. 4), and a second control side 47 is mounted thereto so as to mount a second template 48, for bi-directional movement along a second template motion axis 49 which may conveniently be parallel to the first coordinate axis and is non-parallel to the other coordinate axis.

A first tracer mechanism 55 is mounted to an arm 56 that forms a part of the first working slide. The tracer mechanism shown in of the type generally recognized as a "tracer valve" whose function is that of a four-way valve having a null condition when in a centralized position and a pair of operating conditions on each opposite side of null, where flow is provided in one direction or in the opposite direction. The tracer includes a stem 57 which has a motion along a control axis 58 that is normal to the template motion axis. A follower 59 follows the edge 60 of the template, and an internal spring yet to be described, biases the stem against the follower. The follower is pivoted at a hinge 61 which is mounted by the body of the tracer mechanism to provide for the tracing of the template edge (reference surface by) the follower.

A second tracer mechanism 65 is mounted to the second working slide, it too having a stem 66 with a control axis 67, the stem abutting a follower 68 mounted by a hinge 69 to the body of the tracer. Tracer mechanisms 55 and 65 are identical, tracer mechanism 65 being shown in greater detail in FIG. 5. Each tracer mechanism is mounted by a tracer mounting means such as a bracket in an operative relationship by linking means which might be (and is in this case) means 65a rigidly attaching the said brackets to the respective working slide.

The control slides and control slideways in sets are generically referred to herein as "template support means". It will be noted that they drive the templates so that their reference surfaces (edges) such as surface 60 move along a path normal to the control axis of the respective tracer valve.

There is an additional feature utilized in combination with the second tracer mechanism which comprises a bracket 70 fixed to an extension of the first working slide. A clamp 71 (See FIG. 5) is adapted to engage a retainer plate 72 which, when so engaged, retains the follower in a fixed position so as to hold the follower away from the template during an operation subsequently to be described.

Figure 2:
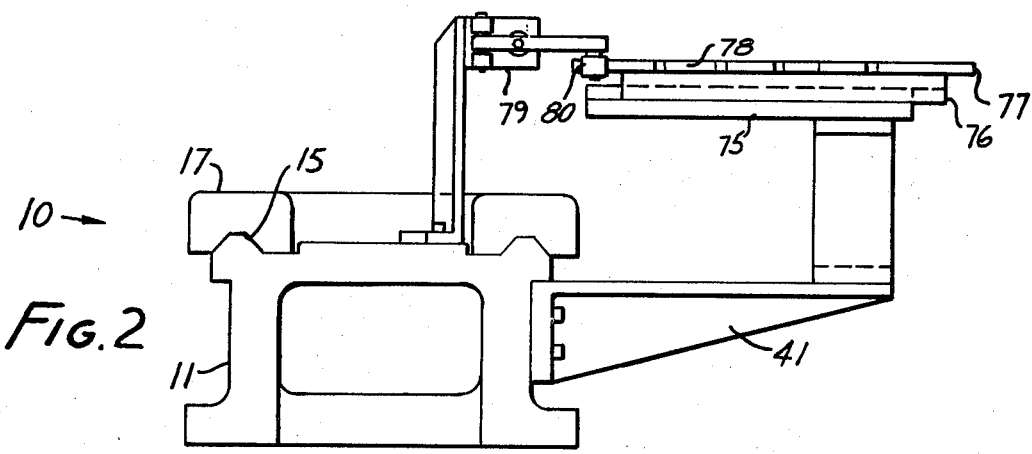
FIG. 2 is a side elevation taken at line 2—2 of FIG. 1.

A rate control slideway 75 (see FIG. 2) is mounted to an extension 41 of the base and extends in any desired direction, but is most conveniently parallel to the second coordinate axis. A rate control slide 76 is reciprocally mounted to slideway 75 and carries a rate control template 77 having an edge 78. A power control means 79 is provided with a follower 80 that follows edge 78. Means 79 is mounted to the base.

Template drive means 85 comprises a motor which synchronously drives all three templates at the same rate. It is downstream from means 79 and its rate of operation is controlled by means 79. The equal rate of speed at which all of the templates are driven is relative to the respective slideways along which they move. This is to sag, the first template will move at the stated speed relative to the base and the second template will move at the same stated speed relative to the first working slide, but it will be understood that the rate of speed of the templates in space along their respective axes may be quite different because the absolute velocity of the first working slide because it is carried by the first working slide. In practice, a drive linkage 86 is provided in the nature of a flexible rotary cable, the sheath of which is connected to the respective slideway and the internal cable of which is connected to a drive screw journalled to the slideway and operatively connected for driving the respective slide. In the case of the second control slide and slideway, the sheath would be attached to the first working slideway and the cable to a screw driving the second control slide.

It is to be understood that the device shown is the simplest now known to accommodate the units shown. However, as in the case of other tracer mechanisms, it is only necessary that the tracer mechanism and template as a pair, be interposed between two members relative to which a coordinate motion is to be supplied by linkage means which link the template and tracer mechanism as a pair between the relatively movable elements. In the case of the second template, for example, the template-tracer mechanism system is interposed between first working slide and the second working slide. It is immaterial to which slide the template or tracer mechanism is mounted and it is also immaterial whether the tracer is moved and the template held still, or the reverse. Therefore, in the specification and in the claims, the reversal of parts is contemplated. This is also true for the machine shown in FIGS. 10 and 11.

Drive means 85 may also drive other templates for controlling other machine functions. These other templates may be mounted to separate slideway-slide systems, or they may instead be mounted to any of the other slides, either in adjacency, or in an overhanging stack. Respective followers might control potentiometers, speed control switches, or the like, and could control such devices as coolant pumps, spindle drive motors, multiple-position tool holders, or the like.

FIG. 5 illustrates tracer mechanism 65 in greater detail. In accordance with standard construction, the device includes a body 96 having an internal spool passage 97 with a pair of motor supply ports 98, 99 for providing fluid under pressure to one side or the other of a bi-directional motor. Suitable pressure and exhaust ports (not shown) are supplied through the sleeve.

A spool 100 is slidably fitted in the passage and has grooves 101, 102, 103 for pressure and exhaust connections in accordance with standard tracer valve operations. Full details of such a valve may be found in U. S. Pat. No. 2,753,145 to Rosebrook. A spring 104 biases the spool against stem 66, which stem bears against follower 68.

A retract groove 105 is formed in the periphery of the spool and is engaged by an eccentric pin 106 which pin has the capacity to retract the spool toward the right in FIG. 5 so as to draw the spool away from the template and cause separation of the tracer valve and the template.

The follower 68 includes a tip 110 adapted to follow the edge of the template. It is pressed downwardly by a bias spring 111. It may be withdrawn by an axial upward pull and given a partial turn so as to remove pin 112 from slot 113 to withdraw the follower from contact with the template when such condition is desired in returning the system to "start" in order that there will be no interference between the follower and the template in that operation. Clamp 71 is shown as being engageable with retainer plate 72 so as to hold the follower in an immovable position relative to the template during the return-to-start condition of the system.

FIG. 7 shows a hydraulic system useful with this invention. The first and second motors 20 and 28 are shown, and their actuation and directions are the primary functions of the system shown. The tracers and other valves are shown in standard JIC notation, all of them being shown in their closed-to-flow position, the alternate positions being shown in the other blocks.

A pressure supply means 120 such as a pump is shown withdrawing fluid from reservoir 121, there being a pressure relief valve 122 for shunting excess pressure out of manifold line 123. Line 123 extends to both tracer valves 55 and 65 and to the power control means 79. The tracer valve connections to the respective motors 20 and 28 are shown, and exhaust manifold line 124 departs from the tracer valves and returns to the reservoir.

Flow of pressure fluid to respective ones of motors 20 and 28 is therefore controlled by the first and second tracer mechanisms which in turn are under the control of the respective template contours.

The rate control mechanism is shown in series connection with a bi-directional selector valve 125 which determines the direction of drive of the templates. The rate of flow to motor 85 is controlled by power control means 79 (in series with valve 125) which may conveniently be a metering valve whose passage of drive fluid to motor 85 is a function of the projection of the edge of the rate control template from its datum base.

The tracer valves act in their conventional manner, supplying fluid under pressure to one side of the piston or the other to cause the desired movement, or balancing the pressure at the null condition to cause no movement. Reference may be made to the said Rosebrook patent for more details as to tracer valve operation.

Valve 150 is a shut off valve to prevent cross motion during the return of the tools and template. It may be used as an alternative to clamp 71.

The general operation of the machine tool of FIG. 1 is as follows. All of the templates are shown at their starting condition in FIG. 1. Relative to that FIG., first template 43 and rate control template 77 will be driven in a downward direction and second template 48 will be driven to the left (both are, of course, parallel to the XZ plane). The cutting tools are entirely out of contact with the workpiece and it is desired to move one of the cutting tools, in this case cutting tool 36, into a position to machine the workpiece, and guide it through a path respective thereto. FIGS. 1 and 5 also show the second tracer mechanism in its withdrawn retracted condition with clamp 71, engaged to the retention plate.

The engagement of the clamp prevents the tracer valve from seeking the template. Withdrawal of the tip permits the template to have moved past the follower without interference when the templates were returned. With this arrangement the set up can be moved to its "start" condition.

To start the cycle, the follower 68 is lowered to the elevation of the template, and the clamp is released. This tip provision may be provided for the first tracer mechanism, also, if desired, in which event it, too, will be lowered, and both tracers will seek their templates. The templates will have been returned to their starting positions after the last cycle. The seeking movement is caused by the spring bias in the tracer mechanisms.

Next, valve 125 is shifted to operate motor 85 in its forward direction. Now each of the followers will follow its respective template edge and through the tracer valve will actuate the respective motors to move the working slides, so as to assume a position in the respective coordinate axes corresponding to the displacement of the template edge from the datum line of each respective template. Therefore, the contact positions of the tangent points between the follower and the respective templates will between them determine a unique path in space for the cutting tool and it will be understood that respective cyclic operations can be obtained simply by forming the edge of the template in such shape as to cause a retracting or reversal of motion of the second working slide.

The return-to-start procedure is not used between passes (sometimes called "cuts and returns"), because the between-pass movement is under tracer control. This may be sped up by increasing the speed of motor 85 (under control of the rate control template) during non-cutting operations. When the part is completed, the tools and the templates must be returned to the starting position. The return of the tools is caused by template control. Then the templates are to be returned, but tracer valve contact is to be avoided. The tracer valve 65 will be placed in retract by pin 106 and the clamp 71 clamped (or valve 150 closed). The tips are lifted, and motor 85 is reversed. The templates thereby bypass the followers. At the end of this motion, the tips will be lowered, the clamp released (or valve 150 opened) the retract pin or pins released to permit the tracers to seek the template, and the cycle is repeated.

It will be noted that it is possible, by extending the edge parallel to the direction of the template motion to provide for dwell segments at which time there is no motion along a relative axis, and that this can be done concurrently on both templates so that there is no tool motion at all. Accordingly, dwell segments can be provided for the tool programming which enable the control over the manufacturing to be greatly improved. Furthermore, by utilizing the rate control means which can vary the speed of template feed, at any point along the program, the cutting rate as defined by the rate of surface motion along the part can infinitely be modified so as to tailor the cutting speed to that required for specific areas. Similar controls can be provided for spindle speeds wherein a set up such as for the rate control template may be provided to govern the power supply to the spindle. It is therefore no longer necessary to slow down the rate of the entire program merely to accommodate tight corners, or spindle speed restrictions.

The shapes of the templates needed for making parts hereunder are readily determined by straight forward calculations based upon the coordinates of the points to be reached by the cutting tool. The following example is related to the first steps of forming the part shown in the chuck in FIG. 1, starting from a cylindrical blank. Only the contour needed for traversing from points a through j (FIG. 6) will be described, because the template may be of indefinite length, and further disclosure would merely be repetitive. This discloses two full passes. In the following table, the axis of rotation constitutes the zero point as to the X axis, and a datum point on the X axis to the left of the chuck is the Z axis datum point. The dimensions are in inches. The "-Cross" and "Long" tabulation is related to points on the X and Z coordinate axes of the salient points on the part, and represent also the distance of the template edge (reference surface) from the datum line of the respective template. The location of such salient points along axial the length is determined by the calculations as below. Corresponding points are labeled on the templates.

| point | cross | diff | long | Cum Diff | Diff | motion | Sl-ope Factor | Fa-tored Cum diff | Accum Sum |
|---|---|---|---|---|---|---|---|---|---|
| a | .550 |      | 3.050 |       |       |      |    |       | 0 |
|   |      | .000 |       | 1.430 | 1.430 | seek | .7 | 1.001 | 1.001 |
| b | .550 |      | 1.620 |       |       |      |    |       |       |
|   |      | .100 |       | .100  | .200  | feed long | .7 | .140 | 1.141 |
| c | .650 |      | 1.520 |       |       |      |    |       |       |
|   |      | .000 |       | .500  | .500  | feed long | .7 | .350 | 1.491 |
| d | .650 |      | 1.020 |       |       |      |    |       |       |
|   |      | .000 |       | 2.030 | 2.030 | feed long | .7 | 1.421 | 2.912 |
| e | .650 |      | 3.050 |       |       |      |    |       |       |
|   |      | .270 |       | .000  | .270  | return long | .7 | .054 | 2.966 |
| f | .380 |      | 3.050 |       |       |      |    |       |       |
|   |      | .000 |       | .850  | .850  | feed cross | .2 | .595 | 3.561 |
| g | .380 |      | 2.200 |       |       |      |    |       |       |
|   |      | .070 |       | .180  | .250  | feed long | .7 | .175 | 3.736 |
| h | .450 |      | 2.020 |       |       |      |    |       |       |
|   |      | .000 |       | .400  | .400  | feed long | .7 | .280 | 4.016 |
| i | .450 |      | 1.620 |       |       |      |    |       |       |
|   |      | .000 |       | 1.430 | 1.430 | return long | .7 | 1.001 | 5.063 |
| j | .450 |      | 3.050 |       |       |      |    |       |       |

The accumulated sum ("Accum Sum") is the sum of the absolute (not algebraic) differences in coordinates from point to point after applying an arbitrary slope factor (which may be unity). It is this location along the template movement axis that determines the location at which the coordinates are pertinent, and at this axial location the reference surface (template edge) is formed at the respective "cross" or "long" dimension. The slope factor shortens the template.

The template's shape therefore has no resemblance to the part. It is determined by selecting a number of points, determining their coordinates, subtracting the differences and adding them, with or without a slope factor, and forming the template with line edges between the points. A straight line parallel to the template motion axis causes no motion along the respective coordinate axis and constitutes a "dwell" as to that axis. There is a total dwell when both axes have such segments at once. An oblique line causes motion. Curves, radii and the like can be determined by dividing them into short segments, setting their points, and blending in the curves to connect them.

The following relating to tool movement line segments describes the motion of the tool under the control of templates formed according to the table given above. These points are shown in FIGS. 6, 8 and 9.

*ab* = cutting cyl (removing metal)
*bc* = cutting taper, rough
*cd* = cutting cyl, rough
*de* = return, no cutting, end first pass
*ef* = position to new diameter
*fg* = cutting cyl (removing metal)
*gh* = cutting taper, rough
*hi* = cutting cyl, rough
*ij* = return, no cutting, end second pass Note particularly that progression from point *d* to point *e* is a return for a second pass and that points *f* to *j* are in a second pass. A typical pair of passes is shown in FIG. 6 related to the templates in FIGS. 8 and 9.

After the part is completed, the follower of the second tracer mechanism is clamped to the retainer plate. The tips are lifted, and the templates are reversely driven back to their starting points. The machine is unloaded and re-loaded, the clamp released, and the cycle repeated.

Any number of passes may be made and the template is not reversed between them when working on one part. They are only reversed when one part is completed and the next part is to be started. Templates shapes are simple and as a straight section (no raise from datum) causes a cylindrical cut to be made. The template is easily made to close tolerances, and non-wavy shapes such as tapers may readily be formed by the use of straight-edged templates.

FIGS. 10 and 11 illustrate the presently-preferred embodiment of the invention. The primary difference between this embodiment and that of FIG. 1 is that the templates, instead of being flat and linear, are cylindrical. The datum line is therefore a circular line extending circumferentially around the cylinder and lying in a plane normal to the axis of the cylinder. The departure of the reference surface in a direction parallel to the axis of the cylinder is the exact equivalent of the "-cross" and "long" dimensions shown in the table, and the "accum sum" used in the table to denote the distance of a given point from an origin along the axis of motion of the datum line itself is measured linearly circumferentially along the datum line on the cylinder just as it was measured linearly but in a flat plane on the templates of FIGS. 8 and 9. It should be observed at this point that the cylindrical templates function precisely as do the flat templates. In both cases, the templates are moved so that the axis of surface motion of the reference surface (the template edge in FIGS. 8 and 9, or the wall of a groove in FIGS. 10 and 11), extends laterally and preferably normally to the control axis of the respective tracer valve. Of course, the edge itself makes different angles of approach from time to time, but the gross effect is that, in the plane normal to the stylus, the relative motion of template and stylus is identical to the case in which a linear template is shifted.

It has been found that for a given length of datum line, a smaller machine tool envelope can be attained with cylindrical templates than with flat templates. However, the functions are completely analogous. The term "template support means" is used generically to connote both slides which support and move flat templates, and spindles which support and turn cylinders.

It has been found that a groove may readily be machined in the surface of a cylinder to form the reference surface, a wall of the groove being used for that purpose.

FIG. 10 shows a machine 150 with a base 151 and spindle 152 for holding and turning the workpiece (not shown). First working slideway 153, integral with the machine base, extends along longitudinal (first) axis 154, and supports first working slide 155, which moves along that axis. This is the saddle.

A second working slideway 156 extends atop first working slide 155 along cross (second) axis 157. A second working slide 159 is mounted to slideway 156. It will be used to support a cutting tool as in FIG. 1. Such details are not repeated here.

A control drive motor 160 is mounted to the base. A first template support means 162 is related to the longitudinal axis, and a second template support means 163 is related to the cross axis. Their respective axes of rotation are parallel (in this case) to the first and second axes. Their rotation is caused by the control drive motor which, through a gear train 164, drives them. The gear train includes a pair of spur gears 165 which drive a shaft 166 which is splined over part of its length. The first working slide has a skirt 167 with internal gear train 168 which engages the splined shaft and can slide along it. Gear train 168 includes another shaft 169 terminating at a miter gear 170 which drives a second miter gear 171 which in turn drives the second template support means.

A second spur gear train 172 drives the first template support means 162. It will thereby be seen that the two template support means are driven at identical angular velocities from the same shaft.

Third template support means 175 is mounted to the base and also is driven by shaft 166.

First, second and third templates 176, 177, 178 are mounted to the respective first, second and third template support means and are driven by them at equal rotational velocities. As can be seen by an examination of FIG. 11, a peripheral groove 179 is formed in the periphery of the first template, a groove 180 in the second template, and a groove 181 in the third template. One of the walls of the grooves in the first and second templates will be traced by the stylus pin of a respective tracer mechanism. In the case of the first and second templates, tracer mechanisms 182 and 183, respectively, will be used, which are of the same general nature as those shown in connection with the earlier figures, having precisely the same properties of respectively shifting the working slides along their axes as a function of the displacement of the edge being followed from a given datum line, the datum line in each of these cases being a circular boundary lying in a plane normal to the central axis of the respective cylinder. Motors, not shown, but which are identical to the system of FIG. 1, are connected in the same manner to the working slides and to the tracer mechanisms.

In the case of the third template, a follower 184 will be engaged to the groove and, as can be seen, more than one function may be provided for on this template by providing more than one groove. In the illustrated case, a potentiometer 185 is adjusted by a sector gear, which potentiometer in turn directly affects the rate of rotation of the motor 160. It will thereby be seen that the feed rate at any given point in time or space along the other templates may be adjusted by a simultaneous rate adjustment of a simultaneously rotating template. It is obvious from FIG. 11 that the rate may be sped up or slowed down as a function of the displacement of the groove from a datum line extending around the cylinder in a plane normal to its axis.

The displacement of the cutting tool from the longitudinal axis, and its location along the longitudinal axis, are controlled by the second and first templates, respectively, in a manner identical to that in the device of FIG. 1. The cutting tool (not shown) will be carried by a tool holder (also not shown) on the second working slide.

It will be noted that instead of being laid out on a flat template, the same template configuration has simply been "wrapped" around a cylinder, and by rotation of the cylinder, the template control edges have been moved past the respective stylus in a manner analogous to that in the other embodiments of the invention.

The term "linkage means" as used herein means such fasteners or other means or mechanisms which are required to link the tracer valve and template support means between the working elements whose relative location they control. In the devices illustrated, such means are the fasteners which mount them to their respective working elements. Were these mechanisms located elsewhere than directly on the machine, then other responsive devices would be used instead of said fasteners. Because the first working slideway is rigidly mounted to, or an integral part of, the base, they are spoken of interchangeably with respect to objects which are mounted or linked to one or the other.

This invention thereby provides means for readily calculating and constructing a plurality of templates for operating tracer-controlled machines under continuous path control with the capability of making repeated passes without changing templates or unloading and reloading the machine, coordinating other machine tool functions, such as feed rate, spindle speeds, coolant supply and the like, all on relatively inexpensive, readily constructed templates which may be either flat or cylindrical as desired.

It will be recognized that, while this invention has been shown as part of a lathe, it may be used wherever positioning is desired, such as on a milling machine.

This invention is not to be limited by the embodiments shown in the drawings and described in the description which are given by way of example and not of limitation, but only in accordance with the scope of the appended claims.

I claim:

1. A control system for controlling the movement of a cutting tool relative to a fixed base along a path related to a first and a second coordinate axis, the position of the tool along said path being under continuous control of the system, said system comprising: a first working slideway extending parallel to the first coordinate axis and mounted to the base; a first working slide mounted to the first working slideway for axial reciprocal movement thereon; a second working slideway extending parallel to the second coordinate axis and mounted to the first working slide for movement therewith; a second working slide mounted to the second working slideway for axial reciprocal movement thereon; first bi-directional motor means drivingly interposed between the base and the first working slide adapted to drive the first working slide in a direction parallel to the first coordinate axis; second bi-directional motor means drivingly interposed between the first and second working slides adapted to drive the second working slide in a direction parallel to the second coordinate axis; a first and a second template support means; a first and a second tracer mechanism, respectively operatively connected to the first and second motor means, and having a respective first and second control axis relative to which they have the function of supplying a null signal causing no motor operation, and two opposite signals causing operation of the motor in each of its directions, as a function of its reaction with a respective template mounted to respective first and second template support means; control drive means simultaneously driving the two template support means so that a reference surface of a respective template supported by each is tracingly engaged by a respective tracer mechanism; first linkage means operatively interlinking the first template support means and first tracer mechanism between the first working slideway and the first working slide, and second linkage means operatively interlinking the second template support means and the second tracer mechanism between the first and second working slides, whereby the movement of the tracer mechanisms along their control axes is proportionally responded to by movement of the first and second working slides along the first and second working slideways; and tool holder means mounted to the second working slide, whereby driving the two template support means causes templates held by them to interact with the respective tracer mechanisms to determine a unique point in space for the tool holder means which is a function of the location of the points of contact between the tracer mechanisms and templates.

2. A control system according to claim 1 in which the template support means comprises a first and a second control slideway and a first and a second control slide, the control slides being adapted to carry the respective templates and drive them along a respective linear axis.

3. A control system according to claim 1 in which the template support means each comprises a rotary member adapted to hold and to rotate a cylindrical template around a respective axis.

4. A control system according to claim 3 in which the first template support means is mounted to the first working slideway, and the second template support means is mounted to the first working slide, the axes of rotation being parallel to the first and second coordinate axes, respectively.

5. A control system according to claim 1 in which a third template support means is provided which is driven by the control drive means, in which a third template is mounted to and driven by said third template support means, and in which follower means follows said third template and controls other machine functions in synchronism with the positioning control exerted by the first and second templates.

6. A control system according to claim 5 in which said other machine function is the rate of operation of the control drive means, the follower means following said third template regulating said rate.

7. A control system according to claim 5 in which each template support means comprises a rotary member to hold and to rotate a cylindrical template around a respective axis.

8. A control system according to claim 7 in which all template support means are driven from a common shaft.

9. A control system according to claim 5 in which the template support means comprises a first and a second control slideway and a first and a second control slide, the slides being adapted to carry the respective templates and drive them along a linear axis.

10. A control system according to claim 1 in which a first and a second template are mounted and driven by the respective first and second template support means, and in which the first and second templates have respective axes of surface motion with a respective datum line parallel thereto, and equal axial distances between points respective to a given location on a part to be manufactured, the location of said points being determined as follows: between each two adjacent points on the part, calculate the absolute difference between their coordinates on both the first and second axis, and add the difference together to obtain a cumulative difference, multiply the cumulative difference by a factor which may but need not be unity to secure a factored cumulative difference, and, at an axial distance from the first of said points equal to the factored cumulative difference and at this axial location forming on the first template a reference surface spaced from the datum line by a distance equal to one coordinate, and on the other template a reference surface spaced from the respective datum line by a distance equal to the other coordinate, and performing this calculation and construction sequentially from point to point.

11. A control system according to claim 10 in which a third template support means is provided which is driven by the control drive means, in which a third template is mounted to and driven by said third template support means, and in which follower means follows said third template and controls other machine functions in synchronism with the positioning control exerted by the first and second templates.

12. A control system according to claim 11 in which said other machine function is the rate of operation of the control drive means, the follower means following said third template regulating said rate.

13. A control system for controlling the movement of a cutting tool relative to a fixed base along a path related to a first and a second coordinate axis, the position of the tool along said path being under continuous control of the system, said system comprising: a first working slideway extending parallel to the first coordinate axis and mounted to the base; a first working slide mounted to the first working slideway for axial reciprocal movement thereon; a second working slideway extending parallel to the second coordinate axis and mounted to the first working slide for movement therewith; a second working slide mounted to the second working slideway for axial reciprocal movement thereon; first bi-directional motor means drivingly interposed between the first working slideway and the first working slide adapted to drive the first working slide in a direction parallel to the first coordinate axis; second bi-directional motor means drivingly interposed between the first and second working slides adapted to drive the second working slide in a direction parallel to the second coordinate axis; a first and a second control slideway; a first and a second control slide respectively slidably mounted to the first and second control slideways; a first and a second tracer mechanism respectively operatively connected to the first and second motor means, and having a respective first and second control axis relative to which they have the function of supplying a null signal causing no motor operation, and two opposite signals causing operation of the motor in each of its directions, as a function of its reaction with a respective template mounted to respective first and second control slides; control drive means simultaneously driving the two control slides along their respective slideways parallel to respective template movement axes, said template movement axes being oblique to the respective control axes; first and second tracer mounting means respectively mounting the tracer mechanisms for movement along their respective control axes; linkage means operatively linking the first and second tracer mounting means to the first and second working slides, whereby the movement of the tracer mechanisms along their control axes is proportionally responded to by movement of the first and second working slides along the first and second working slideways; and tool holder means mounted to the second working slide, whereby driving the two control slides along their respective axes causes templates held by them to interact with the respective tracer mechanisms to determine a unique point in space for the tool holder means which is a function of the location of the points of contact between the tracer mechanisms and templates.

14. A control system according to claim 13 in which a rate control slideway is mounted to the first working slideway, a rate control slide is mounted to the rate control slideway, a power regulator is mounted to the base and responsive to the contour of a rate control template carried by the rate control slide, the power regulator being interposed in the power supply to the control drive means, the control drive means driving the rate control slide simultaneously with the first and second control slides.

15. A control system according to claim 13 in which a third control slideway is mounted to the first working slideway, a third control slide is mounted to the third control slideway, and means controlling another function is responsive to the contour of a template carried by said third control slide.

16. A control system according to claim 13 in which a rate control slideway is mounted to the base, a rate control slide is mounted to the rate control slideway, a power regulator is mounted to the base and responsive to the contour of a rate control template carried by the rate control slide, the power regulator being interposed in the power supply to the control drive means, the control drive means driving the rate control slide simultaneously with the first and second control slides.

17. A control system according to claim 13 in which a retainer plate is mounted to the first working slide, in which a follower is mounted to the second tracer mechanism for following a template, and a clamp is mounted to the follower of the second tracer mechanism to engage the retainer plate when the tracer valve is not to respond to its respective template.

18. A control system according to claim 17 in which the follower is movable from the plane of the respective template.

19. A control system according to claim 13 in which shut off means is provided in the power supply to the second motor means to decouple the second tracer mechanism from the second motor means.

20. A control system according to claim 13 in which the tracer mounting means comprises the body of the respective tracer mechanism, and in which the linkage means comprises means for mounting the said mounting means to the respective working slide.

21. A control system for controlling the movement of a cutting tool relative to a fixed base along a path related to a first and a second coordinate axis, the position of the tool along said path being under continuous control of the system, said system comprising: a first working slideway extending parallel to the first coordinate axis and mounted to the base; a first working slide mounted to the first working slideway for axial reciprocal movement thereon; a second working slideway extending parallel to the second coordinate axis and mounted to the first working slide for movement therewith; a second working slide mounted to the second working slideway for axial reciprocal movement thereon; first bi-directional motor means drivingly interposed between the first working slideway and the first working slide adapted to drive the first working slide in a direction parallel to the first coordinate axis; second bi-directional motor means drivingly interposed between the first and second working slides adapted to drive the second working slide in a direction parallel to the second coordinate axis; a first and a second template support means adapted to support a respective first and second cylindrical template and rotate them around an axis parallel to the first and second coordinate axes, respectively, so as to move the peripheral surface of each template laterally past the respective axis; a first and a second tracer mechanism respectively operatively connected to the first and second motor means, and having a respective first and second control axis relative to which they have the function of supplying a null signal causing no motor operation, and two opposite signals causing operation of the motor in each of its directions, as a function of its reaction with a respective template mounted to respective first and second template support means; control drive means simultaneously rotating the two template support means so that a reference surface of the respective template is tracingly engaged by a respective tracer mechanism; first linkage means operatively interlinking the first template support means and first tracer mechanism between the first working slideway and the first working slide, and second linkage means operatively interlinking the second template support means and the second tracer mechanism between the first and second working slides, whereby the movement of the tracer mechanisms along their control axes is proportionally responded to by movement of the first and second working slides along the first and second working slideways; and tool holder means mounted to the second working slide, whereby rotating the two template support means around their respective axes causes templates held by them to interact with the respective tracer mechanisms to determine a unique point in space for the tool holder means which is a function of the location of the points of contact between the tracer mechanisms and templates.

22. A control system according to claim 21 in which a third template support means is provided which supports a respective third cylindrical template and rotates it around an axis, being driven synchronously with the other two templates by the control drive means, and in which follower means follows said third template and controls other machine functions in synchronism with the positioning control exerted by the first and second templates.

23. A control system according to claim 22 in which said machine function is the rate of operation of the control drive means, the follower means regulating said rate.

* * * * *